May 26, 1925.
C. W. ROBINSON
1,539,098
THREE-WAY TRACTOR LUG
Filed Sept. 14, 1923
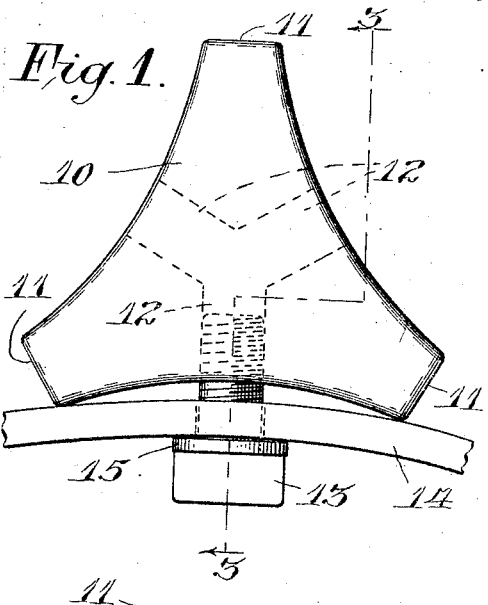
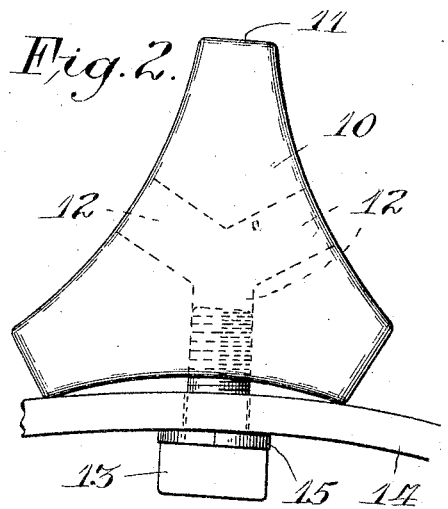
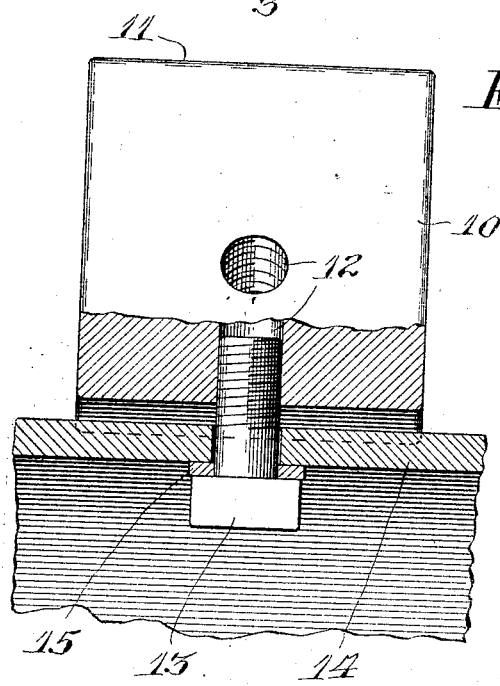
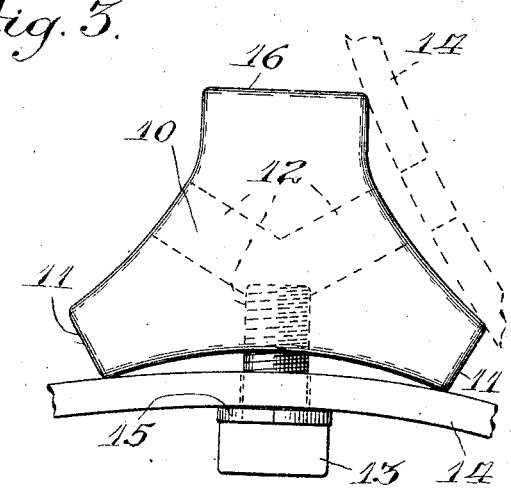
Inventor:
Charles W. Robinson,
By N.P. Doolittle
Atty.

Patented May 26, 1925.

1,539,098

UNITED STATES PATENT OFFICE.

CHARLES W. ROBINSON, OF AUBURN, NEW YORK, ASSIGNOR TO INTERNATIONAL HARVESTER COMPANY, OF CHICAGO, ILLINOIS, A CORPORATION OF NEW JERSEY.

THREE-WAY TRACTOR LUG.

Application filed September 14, 1923. Serial No. 662,641.

*To all whom it may concern:*

Be it known that I, CHARLES W. ROBINSON, a citizen of the United States, residing at Auburn, in the county of Cayuga and State of New York, have invented certain new and useful Improvements in Three-Way Tractor Lugs, of which the following is a full, clear, and exact specification.

My invention relates to lugs for the rims or tires of traction wheels.

It is a well known fact that wheels of tractors and the like equipped with ground engaging lugs exert a greater tractive effort than wheels not so equipped, by preventing slippage.

Thus the general object of my invention is to provide an improved lug of this character of simple construction, and one that is easily attached and detached from the tire or rim of a traction wheel.

More specifically, the object of my invention is to provide what I choose to call a three-way lug; that is, a lug which embodies at least three ground engaging portions or points, each of which is selectively adapted to serve as a ground lug when one of the others used has become too worn to exert the proper tractive effort.

I accomplish this object by providing a trihedral block of suitable material, preferably cast iron, each of the three side faces thereof being similar in contour and having a hole drilled therein, and suitably tapped for the reception of a screw bolt whereby any face may serve as a base for attachment to a traction wheel tire and the opposing point as the ground engaging lug.

Like characters of reference denote like parts throughout the several views of the drawing and specification, and, in the accompanying sheet of drawings wherein I have illustrated the preferred form of my invention,—

Fig. 1 is an end view of my lug shown attached to a fragment of a traction wheel tire;

Fig. 2 is a similar view showing the lug rotated in a clockwise direction through an angle of approximately 120 degrees to bring the next adjacent ground engaging portion into action after the first lug has been ground down too far to be of further service;

Fig. 3 is a side view taken along the line 3—3 of Fig. 1, a portion thereof being shown in section; and Fig. 4 is an end view of a modified form of my lug.

Referring to Figs. 1 and 3, it will be observed that my improved traction lug comprises a unitary cast block, indicated generally by the numeral 10, having three rectangular or similar side faces which are concaved as shown. There are thus provided three apices forming ground engaging portion 11. Each of the concaved side faces has drilled approximately centrally therein an aperture 12 suitably tapped for the reception of a screw bolt 13. This screw bolt has an enlarged head and is adapted to be inserted through an aperture provided in the rim 14 of the traction wheel and into one of the drill holes 12 for attaching the lug to the wheel tire. To prevent displacement of the lug, a lock washer 15 may be inserted between the head of the bolt and the wheel tire. It will be observed that the ground engaging portions are slightly truncated to provide flat faces, and, as the device is triangular and the drill holes are substantially centrally disposed with respect to the side faces, each ground engaging portion or truncated end face is in alignment with a drill hole on the opposing side face.

After one of the lugs has been used a while in the field, it will naturally become worn and the original truncation will become broader and provide too large a ground engaging surface to be very serviceable. The lug may then be detached by removing the screw bolt and rotating it through an angle of approximately 120 degrees to bring the next adjacent ground engaging portion into operative position, and the device may then be used just as though it were a new lug. It will be seen that there are three lugs or ground engaging portions, each of which may be used in turn, thereby greatly prolonging the service of a device of this character.

After one of the ground engaging portions has become too flattened to be of service in the field, it is admirably adapted to use as a road lug in such jurisdictions where legal requirements forbid the use of a too pointed lug, due to its destructive cutting of the road surface.

In Fig. 4, I have shown a slight modification wherein are provided but two ground engaging portions, the third portion being adapted for road use. This I accomplish by truncating one of the apices considerably more than the other two, as shown at 16, to provide a larger contacting surface. In full line position in this figure, this broad portion 15 is in operative position for contact with a road surface. To show how the next adjacent lug may be brought into position for field use, I have shown a portion of the wheel tire in dotted line position. It will also be observed that the drill holes in this modification have been slightly lowered so that the side faces of the block will better fit the wheel tire in any one of its three positions.

While I have shown my improved lug with square shaped side faces and extending but part way across the width of the wheel tire, it is to be understood that the side faces may be rectangularly elongated and be provided with a plurality of drill holes in each face without departing from the spirit of my invention. As various changes of form, construction and arrangement may be made by those skilled in the art without departing from the spirit of this invention, it is to be understood that I do not limit my invention to the precise embodiment disclosed, as indicated by the subjoined claims.

I claim:—

1. A tractor lug having more than two equi-distantly spaced ground engaging portions of similar surface contour, any one of which is individually adapted to use in ground engaging position.

2. A tractor lug, comprising a block, having more than two spaced projecting portions of similar surface contour, any one of which is selectively adapted to use as a valve engaging member.

3. A tractor lug having more than two equi-distantly spaced ground engaging portions of similar surface contour, and means for fastening said lug to a traction wheel in any one of a plurality of positions to bring one of said portions into ground engaging position.

4. A traction lug for wheel tires comprising a block having more than two ground engaging portions equi-distantly spaced from each other, a face opposite each ground engaging portion and an aperture in each face, any one of said apertures adapted to selectively receive a fastening means for locking the lug to the wheel tire.

5. A trihedrally shaped traction lug having rectangularly shaped bases, a flattened ground engaging portion opposite each base, and means for selectively fastening any one of said base portions to a wheel tire.

6. A triangularly shaped traction lug having three rectangularly elongated side faces with an aperture in each face, the apices of the triangular portion being truncated to provide ground engaging portions, and means insertable through the tire of a traction wheel and one of said apertures for fastening the lug in position on a wheel tire.

7. A trihedrally shaped lug for traction wheels, the faces thereof being concave and each having an aperture for the reception of a screw bolt, whereby any face may be used as a base for fastening said lug to the traction wheel tire.

8. A trihedrally shaped lug for traction wheels, the side faces thereof being concave and the apices truncated, a threaded aperture in each face, and means adapted to engage any one of said apertures for locking the lug to the wheel.

9. As an article of manufacture, a trihedrally shaped lug, and means for securing any one of its three faces to the tire of a traction wheel.

10. As an article of manufacture, a polyhedral block having a plurality of ground engaging portions, a concaved face opposite each ground engaging portion, and means for fastening any one of said faces to the tire of a traction wheel.

11. As an article of manufacture, a polyhedral block having a plurality of flattened ground engaging portions, a concaved face between each adjacent ground engaging portion, and means for fastening any one of said faces to the tire of a traction wheel.

12. A trihedrally shaped lug for traction wheels cast as an integral solid block and having an aperture in each side face extending radially inwardly, and means insertable through any of said apertures to fasten selectively any face to the rim of the traction wheel.

13. A trihedrally shaped lug for traction wheels cast as an integral solid block and having concaved side faces with a centrally arranged radially inwardly extending threaded aperture in each side face, and a screw bolt engageable with any of said apertures selectively to fasten any face to the rim of the traction wheel.

In testimony whereof I affix my signature.

CHARLES W. ROBINSON